Patented July 4, 1939

2,164,784

UNITED STATES PATENT OFFICE 2,164,784

PROCESS FOR THE PREPARATION OF DYE-STUFFS AND INTERMEDIATES OF THE ANTHRAQUINONE SERIES

William L. Rintelman, Carrollville, and William Dettwyler, Milwaukee, Wis., assignors to E. I. du Pont de Nemours & Company, Wilmington, Del., a corporation of Delaware No Drawing. Application September 27, 1935, Serial No. 42,392

5 Claims. (Cl. 260—303)

This invention relates to the preparation of new anthraquinone dithiazole compounds and intermediate products.

In United States Patent 1,891,447 to W. L. Rintelman et al., the preparation of diaryl-1,2,5,6-anthraquinone dithiazole is described, wherein the 1,5-disulfide derivative of 2,6-diamino-anthraquinone is reacted with an aromatic aldehyde or similarly reacting compounds, such as benzalchloride or benzotrichloride in sulfuric acid. These products dye cotton from the usual vat in yellow shades.

We have found that new and valuable dyestuffs of this series, which are useful not only as dyestuffs themselves, being redder in shade than the known unsubstituted products, but which are also valuable as intermediates for the preparation of other dyestuffs, can be prepared by reacting 1,3,5,7-tetrahalogen 2,6-diamino-anthraquinones or 1,3,6,8-tetrahalogen 2,7-diaminoanthraquinones with alkali metal sulfides to form the corresponding alpha-alpha-dimercaptans which in turn are condensed with aromatic aldehydes or similar reacting compounds to form the dihalogen-anthraquinone dithiazoles. Alternatively the dimercaptan can be oxidized to the disulfide and condensed with aldehydes in the same manner to give the same products.

The new dimercaptan compounds formed as intermediates in this process are valuable not only for the preparation of dithiazole compounds but also for the preparation of other dyestuffs, wherein known anthraquinone mercaptans have been used. The presence of the two unreacted halogen groups in the molecule render these new intermediates valuable for further condensation reactions.

The following examples are given to more fully illustrate our invention. The parts used are by weight.

*Example I*

Charge an autoclave with 300 parts methanol (75%) and add 150 parts fused sodium sulfide (60%). Stir until complete solution is obtained, add 33 parts sulfur and stir until all is dissolved. Then add to the dark brown liquor 50 parts of 2,6-diamino 1,3,5,7-tetrachloroanthraquinone and 0.1 part of cuprous chloride. Close the autoclave and heat to 110° and hold for 20 hours. Cool and dilute with about 500 parts cold water and filter and suck dry. The dimercaptan is in form of its sodium salt and appears as dark violet needles and dissolves in warm water with a violet color. It is soluble in concentrated sulfuric acid with a brown color. Upon oxidation of its aqueous solution with air a yellow alkali insoluble compound is obtained which is probably a disulfide. The dimercaptan has probably the following formula:

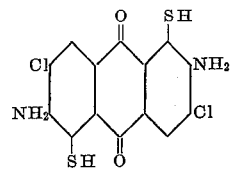

*Example II*

Dissolve in 300 parts sulfuric acid monohydrate 20 parts of sodium salt of 1,5-dimercapto-2,6-diamino-3,7-dichloroanthraquinone and add to the brown solution at room temperature 18 parts benzaldehyde. The color of the solution changes to a green and then to a yellow. Heat to 70° C. and hold ½ hour and dilute into cold water, add 25 parts common salt and 10 parts sodium chlorate and heat to 90°. Maintain at this temperature for 2 hours and filter and wash. The so obtained bright yellow paste dyes cotton in somewhat redder shades than the unchlorinated product. The dry color is a bright yellow powder soluble in concentrated sulfuric acid with a yellow color and gives a violet vat. It contains 13.4% $Cl_2$. It has probably the following formula:

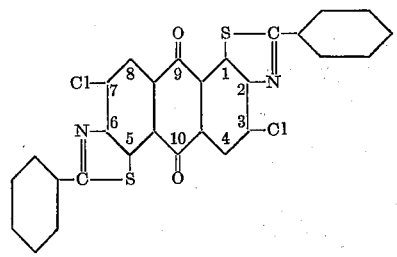

It can be obtained in crystalline form by fractionation from sulfuric acid.

*Example III*

Dissolve 20 parts of the oxidation product of 1,5-dimercapto 2,6-diamino 3,7-dichloroanthraquinone (obtained by aeration of the corresponding mercaptan (of Example I) in aqueous solution in 250 parts monohydrate and add 15 parts benzaldehyde. Heat to 70° and hold ½ hour, dilute into cold water, filter and wash and dry. The color may be further purified by any of the known methods and is identical with the product of Example II.

Example IV

Charge an autoclave with 400 parts methanol (75%) and 200 parts fused sodium sulfide (60%) and stir until complete solution is obtained. Then add 50 parts sulfur and dissolve. Add 75 parts 2,7-diamino 1,3,6,8-tetrachloranthraquinone and 0.1 part cuprous chloride and heat to 110°. Hold for 20 hours and cool. Dilute the contents of the autoclave with 3000 parts water and airblow until no more water soluble material is present. Filter and wash free of alkali and dry.

The so obtained disulfide is a dark brown powder and has a brown sulfuric acid solution. It can be reduced again to the dimercaptan which gives the characteristic violet solution in water.

20 parts of this disulfide are heated in 300 parts monohydrate with 15 parts benzaldehyde at 70° C. for ½ hour. The so obtained 3,6-dichloro 1,2,8,7-dithiazole is a yellow powder and dyes cotton in lemon yellow shades from a violet vat.

Example V 80 parts 1,5-dichloro 2:6-diamino 3:7-disulfo anthraquinone (obtained as in Example II United States Patent 1,899,986) are suspended in 800 parts cold water. To the well agitated solution 60 g. bromine is slowly added and allowed to stir over night. The 1,5-dichlor 2:6-diamino 3:7-dibrom anthraquinone which comes out as an orange precipitate is filtered off and washed free of salts.

50 g. 1,5-dichloro 2:6-diamino 3:7-dibromo anthraquinone is suspended in 250 g. 75% methyl alcohol containing in solution 125 g. sodium sulfide (fused) and 31 g. sulfur. The mass is heated to 76–77° C. and held at this temperature for 72 hours, or alternately it may be heated in an autoclave at 110° for 18 hours or until the chlorine has been replaced by sulfur. The mass is cooled and diluted with 500 parts of water and the blue comparatively insoluble salt of the 1,5-dimercaptan is filtered off, washed with cold water and dried. The product is slightly soluble in hot water to which it imparts a red violet coloration. The sodium salt is readily converted to the free mercaptan by treating the aqueous suspension with an excess of sodium bisulfite. The sodium salt may also be readily oxidized to the disulfide by treatment with mild oxidizing agents such as sodium perborate or a current of air. The corresponding 1,3,5,7-tetra brom 2,6-diamino-anthraquinone may be reacted in the same manner to give the dibromo-diamino-dimercaptan.

Example VI 40 parts of the sodium salt of 1,5-dimercaptan 2:6-diamino 3:7-dibromo-anthraquinone (the disulfide or dimercaptan) are dissolved in 800 parts 100% sulfuric acid at 25° C. 40 parts benzaldehyde are now added and the solution heated to 70° C. and held for ½ hour (alternately it may be allowed to stir 20 hours at room temperature). The sulfuric acid solution is poured into 8000 parts cold water and filtered. The impure color may be purified by treatment with sodium hypochlorite liquor followed by an acid crystallization, for instance from 10 parts 100% sulfuric acid, the concentration of which is slowly reduced to 85%. The pure 1,2,5,6 C-bis phenyl 3:7-dibrom anthraquinone dithiazole obtained in this manner is a yellow crystalline powder which dissolves in concentrated sulfuric acid forming a yellow solution. It is relatively insoluble in all organic solvents. It dyes cotton reddish yellow shades from a violet vat, fast to washing and chlorine.

Example VII

Dissolve 20 parts 1,5-dimercapto-2,6-diamino-3,7-dichloro-anthraquinone in 300 parts sulfuric acid monohydrate and add gradually at room temperature 15 parts ortho-chloro-benzaldehyde. Then heat the greenish solution up to 70° C. and hold one half hour, cool to room temperature and drop in slowly 156 parts water. The dyestuff crystallizes out and is filtered off. It is a yellow powder soluble in concentrated sulfuric acid with a yellow color and dyes cotton in bright yellow shades from a blue-violet vat. It contains 4 chlorine atoms and has probably the following constitution:

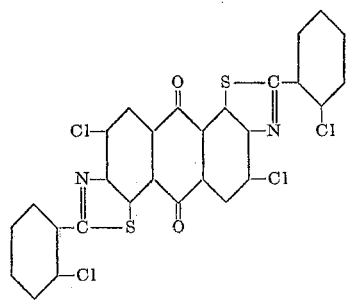

Example VIII

Dissolve 25 parts 1,5-dimercapto-2,6-diamino-3,7-dichloro anthraquinone in 250 parts sulfuric acid monohydrate and add slowly at 20° 25 parts 2-nitro-6-chloro-benzaldehyde. Then heat the yellow green solution to 75° and hold one half hour, dilute into cold water, filter and wash. The new compound is a yellow powder, soluble in concentrated sulfuric acid with a yellow color and dyes cotton in a red brown shade from a violet vat and has probably the following formula:

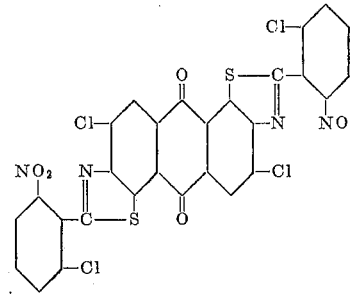

The corresponding amine which is obtained by alkaline hydrosulfite reduction is a dark brown powder.

As illustrated in the above examples, the dimercapto anthraquinone compound is preferably condensed with the aldehyde when in the form of the alkali metal salt, although the free mercaptan or the corresponding disulfide may be used if desired.

Other aldehydes than those specifically mentioned in the examples may of course be used. The following are given to illustrate the broad scope of our invention: Meta-methyl-benzaldehyde, anisic-aldehyde, 3,4-dihydroxy-benzaldehyde, alpha or beta naphthaldehyde, 1-amino-anthraquinone-6-aldehyde, 2-anthraquinone-aldehyde, furfuryl aldehyde, etc., our invention not being limited to any specific class of aldehydes within the aromatic series.

As illustrated above, the tetrachloro, tetrabromo, or mixed dichloro-dibromo-diamino-anthraquinone compounds may be used for the preparation of the dimercaptans of this series.

What we claim is:

1. The process for producing beta-beta-dihalogen-anthraquinone dithiazoles, which comprises reacting a tetra-halogen-diamino-anthraquinone compound of the formula

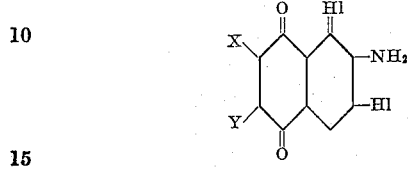

wherein X and Y jointly represent the bivalent radical

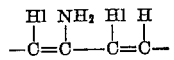

with an alkali metal sulfide and condensing the dimercaptan so formed with an aromatic monoaldehyde in which the aldehyde group is attached directly to the aromatic ring, the reactions being carried out at sufficiently low temperature that no material part of the halogen in the beta position of the anthraquinone radical is eliminated.

2. Beta-beta-dihalogen-anthraquinone dithiazoles of the following general formula

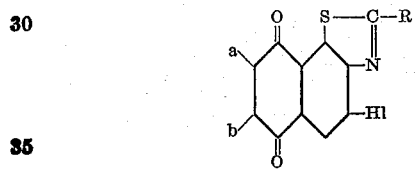

wherein $a$ and $b$ together represent a divalent radical of the formula

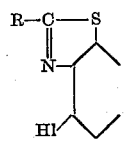

and wherein R, in both cases, is identical and stands for the aromatic radical of an aromatic aldehyde.

3. Beta-beta-dibromo-anthraquinone dithiazoles of the following general formula

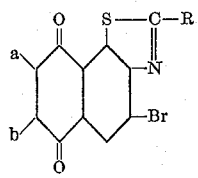

wherein $a$ and $b$ together represent a divalent radical of the formula

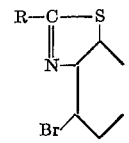

wherein R, in both cases, is identical and stands for the aromatic radical of an aromatic aldehyde.

4. Beta-beta-dichloro-anthraquinone dithiazoles of the following general formula

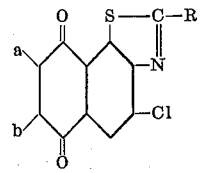

wherein $a$ and $b$ together represent a divalent radical of the formula

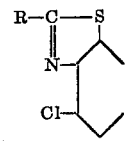

wherein R, in both cases, is identical and stands for the aromatic radical of an aromatic aldehyde.

5. 3,7-dihalogen C-diaryl 1,2,5,6-anthraquinone dithiazole in which the aryl radicals are identical and are the aromatic radicals of an aromatic aldehyde.

WILLIAM L. RINTELMAN.
WILLIAM DETTWYLER.